Oct. 24, 1944.    W. L. SCARFF    2,360,983
METHOD FOR OPENING PEA PODS
Filed June 24, 1941
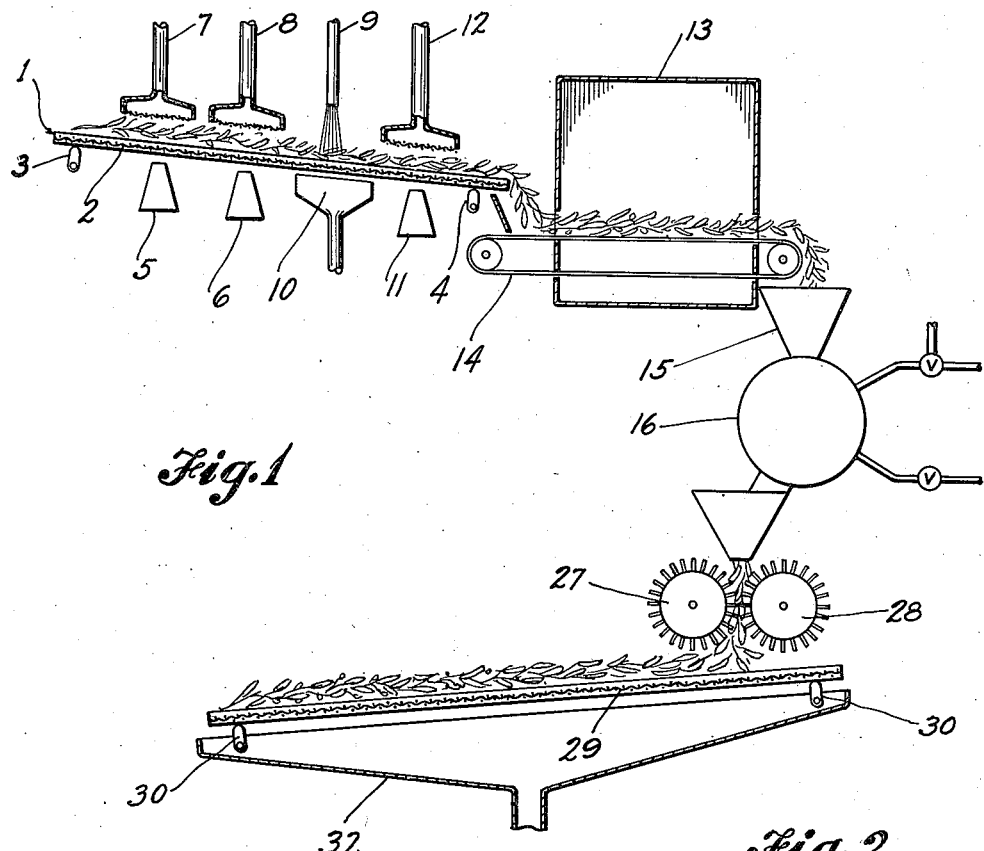
*Fig.1*
*Fig.2*
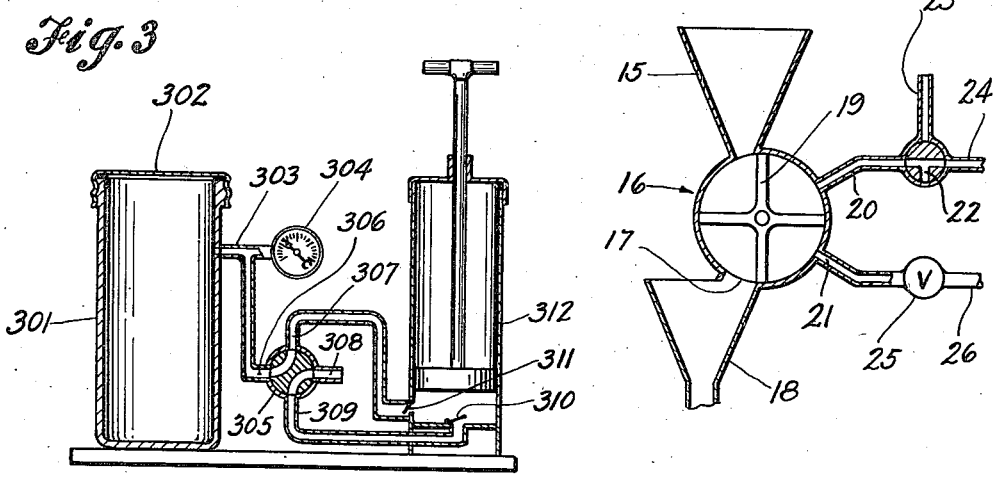
*Fig.3*
INVENTOR.
Way L. Scarff
BY Paul Bliven Patented Oct. 24, 1944

2,360,983

UNITED STATES PATENT OFFICE 2,360,983

METHOD FOR OPENING PEA PODS

Way L. Scarff, Auburn, Wash.

Application June 24, 1941, Serial No. 399,480

4 Claims. (Cl. 130—30)

The present invention relates to method for opening pea pods, and grading and obtaining clean peas. The present method will not only open pea pods in a new and novel manner but by proper regulation will only open those pods of a particular grade, or quality, such as those especially desirable for the freezing market or any other special use, and will insure clean peas with a minimum of handling and inspection.

In devices of the prior art, the pea pods are opened by a beating process. The apparatus used in the beating process of the prior art, has had to be designed to give the pods a hard beating or the pods would not open. This hard beating has been hard enough to crush the tenderer peas. It is these tenderer peas that are the most desirable, as they have the texture and flavor that is wanted by the consumer. This has resulted in the majority of the threshed peas being of inferior grade. It has also prevented the picking of the peas at the peak of perfection, as at that time they are too tender to withstand the threshing process. This threshing process of the prior art has also produced large amounts of trash, and has placed bad peas in with the good. This trash and the bad peas have been difficult to remove from the good peas, and has required large amounts of machinery and hand picking to remove, and to secure a somewhat uniform run of peas.

In selecting peas for canning or freezing, attention must be given to the condition of the pea at the time it is picked. The expert whose job it is to say when the peas are to be harvested, must give consideration to the development of the pea as to size, firmness, sugar content, color, taste, absence of disease, etc. It is difficult to obtain people who will evaluate these various factors in the same manner and degree. For these reasons the peas which are delivered to a processing plant vary greatly in quality among the different growers. Even the judging of the plant expert will vary from time to time as his perceptions may vary from time to time. It will thus be seen that there is some confustion in the application of standards for the grading of peas.

Having in mind these difficulties and defects of the prior art, it is an object of the present invention to devise a process that will open the pods of first quality fresh peas without injury to the peas contained therein and will not open the pods of other quality peas which may be present with the first quality peas.

It is a further object of the present invention to devise a method for acting upon a group of closed pea pods to selectively open only those pods which are of and contain peas of a particular grade, or quality.

It is a further object of the present invention to devise a method of conditioning pea pods so that they will be presented to the opening process in a condition that is uniform from time to time, so that the result of the opening process will be uniform from time to time.

Another object of the present invention is to open pea pods by subjecting them to a vacuum that is rapidly applied.

Another object of the present invention is the elimination of the necessity for a large amount of careful hand sorting of the peas after they have been threshed.

Another object of the present invention is the reduction in the amount of processing, handling, and inspecting of peas after they have been podded, and prior to the preserving step, such as placing in sealed cans or on freezer trays.

Another object of the present invention is the elimination of the many steps of cleaning, washing, and grading of peas after they have been removed from the pods.

Another object of the present invention is to predetermine the ripeness period of growing fields with a hand tester using certain minus pressures on the several varieties of peas grown for the frozen market especially.

Another object of the present invention is to select peas for seed purposes using relative minus pressures to open only the pods of perfect peas which have seasoned in their sealed natural state.

Another object of the present invention is to set definite standard grades according to predetermined degrees of ripeness and quality.

An apparatus that will remedy these defects of the prior art, and will attain the above mentioned objects and others that will be apparent from the description that follows, may be had by passing the pods and vines as they come from the mower in the field, onto a perforated conveyor belt or tray, and moving them along the reach thereof. While so passing along, the pods and vines are subjected to a cleaning action by blowing air up thru the conveyor at a sufficient velocity to remove dirt and chaff. The conveyor may be of a very coarse mesh and be agitated so that dirt and pebbles or other heavy matter will fall therethru. Also, while on this conveyor or one following thereafter, the vines and attached pods may pass under a high pressure water spray that will remove the dust and dirt that adheres closely to the pods and vines. The clean pods and vines then go thru a conditioner wherein the humidity and temperature may be controlled. In this conditioner the temperature of the pods and vines is reduced to around forty degrees Fahrenheit, and the humidity is maintained at or near saturation. This conditioning makes the pods crisp and brittle. From here the pods and vines are fed into an opening device which may comprise a chamber or a series of chambers. These chambers may be formed by enclosing in a cylindrical housing a series of intersecting vanes that revolve about a common axis, the longitudinal axis of the enclosing cylinder. The pea pods and vines are fed into a chamber at one point in its revolution about its axis, say at its upper position. Next, the material is progressed away from its filling position to a place where the pods may be subject to air pressure above atmospheric, say five to ten pounds, gage. After a few seconds up to a couple of minutes, the pods will have adjusted themselves to the new condition, and the pressure within the pod will be that on the outside, at least higher than it was before this treatment. From the pressure position, the material is progressed to a vacuum position where the pressure is rapidly reduced to a point where it is much below that of the previous pressure position. By regulating the degree of the vacuum, or sub-atmospheric pressure, the pods containing peas of a particular quality will open. Those pods which are perforated, too old, or too green, will not open. It is important that the reduction in pressure be rapid. Applicant has found that under ten seconds gives good results. Applicant has also found that a reduction in pressure of from eight to fifteen pounds will open the pods of peas desirable for freezing. The exact amount of the reduction depending from time to time upon the condition of the pods and the quality of peas desired. A little experimentation will determine the exact conditions for the process to give the desired result. From the vacuum position the device is operated to progress the material to the discharge position where it is removed from the chamber. From the opener the pods and vines pass to a beater where they are gently beaten with soft rubber rods, or fingers; this will dislodge the peas from the opened pods but will not open closed pods; from the beater the vines, peas and pods pass to a separator that may be in the form of a perforated shaker tray or belt that will allow the peas to separate from the pods and vines. The pods and vines may be repassed thru the same or similar opening device at a further reduction in the pressure therein, to obtain another grade of peas, or they may be passed thru one of the standard threshers now in use for opening pods. It will be found that the peas obtained by this process will be free of trash, clean, and of a uniform quality. This means that there will be needed but little inspection and no further steps of grading and washing. If the peas are to be frozen they may then be sent directly to the blancher and then to the freezer. This will mean a big reduction in wastage and other costs of operation. If the peas are to be transported for some distance which will involve much time, they may be placed in vacuum chambers for transport as such will reduce their rate of deterioration. It is also possible to remove the pods from the vines before subjecting the pods to the treatment outlined above.

The opening device described above may also be used for opening dried pea pods, especially those which have been selected for seed. The above described process of opening when used on dried pods will operate to open those pods containing peas of a uniform grade. It will not open those pods which are worm eaten, of inferior quality, or damaged in other manners, such as by diseases reaching peas in fractured pods.

While the pods are being subjected to the reduced pressure in the opening device, the surrounding fluid may be either a liquid or a gas. The liquid may be water, which would reduce the amount of pumping necessary to obtain the reduced pressure. The gas, if used, may be air or an inert gas such as nitrogen or carbon dioxide. The use of an inert gas will reduce the rate of deterioration of the peas, and if they are continued in this gas will, when finally processed, be of superior quality as compared with those not so treated.

Several varieties of field peas grown in the Northwest for the frozen market, react well to the exploding method, while some others have not the air space in pods to excite a good fracture. This process may encourage those brands most susceptible to this method, to be grown especially for frozen pack.

The words, "vacuum" and "pressure" are used in a relative sense as regards pressure conditions, and are used to designate different steps in the process described herein. If a "pressure" is applied to the pea pods, such refers to the pressure of the medium surrounding the pods, and such pressure is greater than that which existed in the pods before the application, thereof. If a "vacuum" is applied to the pods, such term is used to designate the pressure of the medium surrounding the pods, and such pressure is a pressure that is lower than that which existed in the pods before the pressure was reduced.

Devices constructed in accordance with the above outline, and which will attain the objects of the present invention, and will remedy the defects of the prior art devices and processes, are hereinafter described in detail and shown in the accompanying drawing, wherein:

Figure 1 is a diagrammatic showing of the process and the apparatus required therefor;

Figure 2 is a more detailed showing of the construction of the opener included in Figure 1;

Figure 3 is a view of a hand operated and portable pod opening, device for use in field tests.

In preparation for the harvest of fresh green field peas, the portable device shown in Figure 3 would be taken into the field. There pea pods which appeared to be representative of the field would be picked by hand and placed in the container 301. This container may be of glass so that the result of the process may be determined without removal of the peas therefrom. The open end of the container is closed and sealed by means of a screw cover 302. The container is provided with a side connection 303. Adjacent the container and communicating with the side connection is a pressure gage 304 reading from zero absolute to forty pounds absolute. The side connection also communicates with a four-way valve 305, having positions 306, 307, 308 and 309. Opposite positions 307 and 309 of the valve connect thru check valves 310 and 311 with a simple reciprocating hand pump 312. The check valves are arranged to pass air thru one of the check valves, thru the pump, and then thru the other check valve, all in only one direction. The fourth position 308 of the four-way valve is a venting position and leads to the atmosphere.

The operation of the device shown in Figure 3 is as follows: Pea pods representative of the field are picked from the vines and placed in the container 301. The cover 302 is secured in place to seal the container from the atmosphere. The valve 305 is placed in the position shown and the pump 312 is operated to take air in from the atmosphere at position 308, of the valve 305, pass such air thru check valve 310, pump 312, check 311, and into the container 301 thru the side connection 303. Pumping is continued until the gage registers a particular pressure say 26 lbs. abs. The pressure is held at this value for about a minute. The valve 305 is then rotated ninety degrees. In this condition, position 307 communicates with 308, and 306 with 309. This allows the air in the container to exhaust thru the pump and position 308. The pump is then operated to rapidly effect a vacuum in the container of about 4 lbs. abs. If the peas and pods are at a particular time in their growth and of a particular condition free from blight, perforations, and mechanical injuries, they will pop open. By a few simple test runs there may be established the relationship between the factors of the runs, such as degree of pressure, vacuum, and the length of time of application of such to the pods, and the quality and ripeness and variety of the peas. With the standards of operations set for obtaining open pods containing peas of a particular quality, it becomes easy for inexperienced persons to test fields of peas to determine the condition of the peas, and, hence, the proper time for harvest. Also, this device will allow the setting of standards that can be stated in terms of pressures and time. This enables the processing plant to state in definite terms the quality of products which it will accept, and to check on that quality in definite terms. Thus the guess work of feeling the pods, opening them, feeling the peas, and tasting them is eliminated as a means of determining when a field is or is not to be harvested. Such sensatory testing need only be done to determine the conditions of operation of the opening device to give a particular quality.

The device shown in Figure 3 might be enlarged so that the container 301 would hold several hundred pounds of peas, and the pump 312 be of a capacity appropriate thereto. This would allow large amounts of pea pods to be processed. Also, by a rearrangement of the piping and the installation of more and different valves it would be possible to use vacuum and pressure reservoirs instead of direct connecting the pump to the treating chamber. This may be desirable to increase the speed with which a particular degree of vacuum is obtained in the treating chamber. Also, the pressure differential and time rate of application of pressure may be varied within quite wide limits depending upon the results desired. In this regard, it is possible to operate entirely at pressures above atmospheric by supercharging the pods by maintaining them above the normal for some time.

Figure 1 is a diagrammatic showing of an apparatus and method which is better adapted to handle large quantities of peas than the device shown in Figure 3. In harvesting peas it will be found that the brittleness of the pod varies somewhat from day to day and hour to hour of the same day. This variation is caused by variations in the temperature and moisture content of the pod. This condition of the pod will also vary greatly depending upon the time elapsing between the cutting of the vine and the presentation to the opener. Applicant has remedied this defect by subjecting the pea pods and the vines, if attached to the pods, to a conditioning process before opening them. This process is illustrated in Figure 1.

In Figure 1 pods and vines are placed on one end of a foraminous conveyor 1 which takes the material and passes it along its reach. This conveyor is constructed so that its face is made up of a coarse mesh screen 2 having openings of a quarter inch to ⅜ inch. This conveyor may be in the form of a continuous belt or a single reach which is vibrated in such a manner and placed at such an angle that the pods and vines will be moved therealong. In either case, means should be provided for agitating the conveyor. If the conveyor is of the shaker type, the shaking may be sufficient, but if of the continuous type it may be advisable to provide shaker cams 3 and 4. As the pods and vines pass along the conveyor they are first subjected to a concentrated jet of air from nozzles 5, 6 arranged underneath the conveyor. These nozzles will serve to further agitate the pods and vines and to remove dust and dirt therefrom. This dust and dirt is carried off through suction hoods, 7 and 8. The agitation of the conveyor will also cause large quantities of the trash to pass therethrough and to fall into suitable receptacles arranged underneath the conveyor. After this preliminary treatment the vines may be passed underneath a water spray or sprays 9 which will wash the remaining dust and dirt from the pods and vines. This water may be collected in a sump 10 arranged underneath the conveyor. A further air blast 11 and suction 12 will remove excess water from the vines. From the cleaning conveyor the pods and their attached vines are passed into a temperature and humidity control chamber 13. The pods and vines may be led through this chamber by means of any suitable conveyor 14. In the temperature and humidity control chamber, the dew point is maintained at or near the saturated condition and the temperature of the vines reduced to around 40° F. This control of the temperature and humidity is for the purpose of placing the pods in a crisp and brittle condition. It is also to be noted that the pods are free from all foreign matter and that if opened at this time the peas therein would not be contaminated by dirt or other foreign material.

From the conditioner, the peas pass into a hopper 15 leading to an opener 16, in which is located one or more chambers which may be sealed from the atmosphere. In the present instance, the opener 16, is in the form of a hollow closed-ended cylinder with an inlet opening in the top thereof communicating with the inlet hopper 15, and a discharge opening 17 at the bottom thereof communicating with the discharge hopper 18. Inside of the cylinder are four blades which run longitudinally of the cylinder and intersect along the axis thereof. These four blades 19 may be rotated about their intersection, the axis of the cylinder, in any suitable manner, such as by mounting on a shaft and driving through suitable gears and cams or the blades may even be driven by a hand crank. The cylinder is also provided, at spaced apart points 20 and 21, with suitable duct connections. The first connection 20 leads to a three-way valve 22, which in turn connects with either a vent 23 or, thru the conduit 24, with a source of compressed air. The other connection 21 is adapted to be coupled with some form of pump or vacuum producing device, by means of the valve 25 and conduit 26.

The hopper 15 will pass a batch of pods and vines into one of the chambers formed by the partitions 19. Rotation of the partitions will cause this chamber to be sealed off from the inlet hopper and from any other opening but that of the pressure inlet 20. By proper regulation of the valve 22 and associated equipment, air or other gas under pressure may be applied to the chamber. The effect of applying a gas under pressure to this chamber, is the same as described in connection with this step, in relation to Figure 3. When the pea pods have been properly conditioned, pressure valve 22 may be actuated to vent the chamber. After venting the chamber, the partitions may again be rotated to bring this chamber in registry with the opening 21. When in this position, proper operating equipment will rapidly reduce the pressure to the desired vacuum condition at which the pods of a particular quality will pop open. At the completion of this step in the process, the partitions 19 may be further rotated to discharge into the hopper 18, the pods, vines, and any peas which have been dislodged by the opening process. As each batch of pods and vines is fed therethrough, another batch will be fed into the succeeding chamber of the opener so that in effect the process is continuous. The operation of progressing the chambers may be done so that they move continuously or intermittently. The pressure and vacuum conduits must be valved to synchronize with the presence of a chamber in the proper position. The vacuum valve 25 and the vacuum producing equipment must give a rapid drop in the pressure. The venting of the applied pressure and the application of a vacuum should give a continuous pressure change.

From the hopper 18 the open pods and vines pass between two beater rolls 27 and 28 for the purpose of ginning the peas. These two beater rolls are studded with rubber pins. These pins have a diameter of a 3/16 inch, or less and project from the face of the drum a distance of 3/4 inch, and are spaced apart 3/8 to 1/4 inch. Such beater rolls when revolved at a proper speed, and when spaced apart so that they barely touch, will remove the peas from the open pods. From the beaters the material passes onto a shaker screen 29, which is agitated by any suitable means such as the cams 30 and 31, and along which the material is passed. The peas, freed from the pods, will pass thru the screen into the hopper 32 and be delivered therefrom to any suitable devices for further treatment.

By the term "ginning" is meant the act of separating the peas from their position of being secured to the pods. This may be done by agitation, by rubbing, by flailing with soft rubber rods, or by any one of many means that would be apparent to one skilled in the art. The ginning must be harsh enough to loosen the peas in the opened pods, but gentle enough not to open closed pods or to crush tender peas.

In the device shown in Figure 1 or in Figure 3, a gas such as carbon dioxide or nitrogen may be used for increasing the pressure on the peas; and in the pressure reducing step, the peas may be flooded with a liquid such as water so that the pumping would not require the removal of such large quantities of vapor and gas. Furthermore, as soon as the peas are opened and removed from the pods, they may be placed in suitable refrigerated vacuum containers or other desired receptacles. The process taking place in the opener 16, is the same as that performed by the device shown and described in connection with Figure 3. The operation of the ancillary equipment is obvious from the above description of these devices and their operation.

Having thus described my invention, I claim:

1. The process of grading peas, comprising: determining the particular pressure reduction of a surrounding fluid required to open only certain pea pods having therein peas of a desired uniform quality, and subjecting a batch of mixed pea pods containing such certain pea pods to said particular pressure reduction in the pressure of a surrounding fluid whereby there will be effected a selective opening of pods containing peas having the desired uniform quality.

2. The process of grading peas, comprising: determining the particular temperature and moisture conditions which must prevail in certain pea pods, and the particular pressure reduction of a surrounding fluid medium required to open only such certain pea pods having therein peas of a desired uniform quality; and conditioning a batch of mixed pea pods containing such certain pea pods to the determined temperature and moisture conditions, and subjecting said batch of pea pods to the determined particular reduction of a surrounding fluid medium, whereby there will be effected a selective opening of pods containing peas having the desired uniform quality.

3. The process of grading peas, comprising: cooling and humidifying closed pea pods to obtain a desired brittleness in certain of the pods, and selectively opening pods having such desired brittleness by subjecting all of the pods to a particular predetermined reduction in the pressure of a surrounding fluid to effect a selective opening of such pods having the desired brittleness, whereby there may be selectively obtained only the peas from those pods opened, which peas will have a desired uniform quality.

4. The process of grading green peas, comprising the steps of, cooling the closed pea pods in a saturated atmosphere for a sufficient length of time to make certain of the pods crisp and brittle, subjecting all the pods immediately after such treatment to a sudden reduction in pressure of a surrounding fluid of between 8 and 15 lbs. to effect a selective opening of such certain pods having the desired brittleness and whereby the old, perforate and immature pods will not be opened and separating the desired peas from the opened pods.

WAY L. SCARFF.